United States Patent
Maeda et al.

(10) Patent No.: US 11,359,706 B2
(45) Date of Patent: Jun. 14, 2022

(54) TORQUE CONVERTER PISTON POSITIONER

(71) Applicant: EXEDY GLOBALPARTS CORPORATION, Belleville, MI (US)

(72) Inventors: Shinichiro Maeda, Westland, MI (US); Ken Mototsune, Canton, MI (US); Scott Binder, South Lyon, MI (US)

(73) Assignee: Exedy GlobalParts Corporation, Belleville, MI (US)

(*) Notice: Subject to any disclaimer, the term of this patent is extended or adjusted under 35 U.S.C. 154(b) by 0 days.

(21) Appl. No.: 17/282,169

(22) PCT Filed: Oct. 1, 2019

(86) PCT No.: PCT/US2019/054034
§ 371 (c)(1),
(2) Date: Apr. 1, 2021

(87) PCT Pub. No.: WO2020/072473
PCT Pub. Date: Apr. 9, 2020

(65) Prior Publication Data
US 2022/0010867 A1    Jan. 13, 2022

Related U.S. Application Data

(60) Provisional application No. 62/739,581, filed on Oct. 1, 2018.

(51) Int. Cl.
*F16H 45/02* (2006.01)
*F16H 45/00* (2006.01)

(52) U.S. Cl.
CPC ....... *F16H 45/02* (2013.01); *F16H 2045/007* (2013.01); *F16H 2045/0205* (2013.01);
(Continued)

(58) Field of Classification Search
CPC ............... F16H 45/02; F16H 2045/007; F16H 2045/0205; F16H 2045/0221; F16H 2045/0278
See application file for complete search history.

(56) References Cited

U.S. PATENT DOCUMENTS

5,682,969 A * 11/1997 Ling .................. F16H 45/02
192/212
6,926,131 B1   8/2005 Arhab et al.
(Continued)

OTHER PUBLICATIONS

International Preliminary Report on Patentability dated Oct. 12, 2020 for International Application No. PCT/US2019/054034.

*Primary Examiner* — Richard W Ridley
*Assistant Examiner* — Aimee Tran Nguyen
(74) *Attorney, Agent, or Firm* — Eric J. Sosenko; Jonathan P. O'Brien; Honigman LLP

(57) ABSTRACT

A launch device having a front cover connectable to the output of a prime mover, an output hub connectable to the input of the transmission, an impeller driven in rotation with the front cover and a turbine fluidly coupled in rotation with the impeller. A damper includes an output member connected to and rotatable with the output hub. A lock-out clutch, when engaged, rotationally locks the damper with the front cover and includes a clutch piston which is axially and rotationally moveable relative to the output hub. A mechanical clutch piston positioner includes first and second interfaces individually associated with either the clutch piston or one of the output member or output hub. The first interface is axially and rotationally moveable relative to the second interface. Upon the first interface overrunning tire second interface, mechanical engagement of the interfaces axially positions tire clutch piston toward the front cover.

11 Claims, 5 Drawing Sheets

(52) U.S. Cl.
CPC ................ *F16H 2045/0221* (2013.01); *F16H 2045/0278* (2013.01)

(56) References Cited

U.S. PATENT DOCUMENTS

| | | |
|---|---|---|
| 10,145,458 B2 * | 12/2018 | Norwich .................. F16H 45/02 |
| 2017/0102060 A1 | 4/2017 | Carrier et al. |
| 2017/0314662 A1 | 11/2017 | Nelson et al. |
| 2017/0328457 A1 * | 11/2017 | Vanni .................. F16D 25/0632 |

\* cited by examiner

TORQUE CONVERTER PISTON POSITIONER

CROSS REFERENCE TO RELATED APPLICATION

This application is a U.S. national stage patent application of PCT Application No. PCT/US2019/054034 filed on Oct. 1, 2019, and claims priority to U.S. provisional patent application No. 62/739,581 filed on Oct. 1, 2018, each of the disclosures of which are incorporated by reference herein in their entirety.

BACKGROUND

1. Field of the Invention

The present invention generally relates to launch devices, such as torque converters, used in connection with the automatic transmission of an automotive vehicle. More specifically, the invention relates to positioning of the clutch piston of such a launch device.

2. Description of Related Technology

Generally, vehicles with automatic transmissions utilize a launch device, such as a torque converter, to couple the output of the engine with the automatic transmission.

The launch device, and more specifically a torque converter, includes a front cover that is connected to and rotates with the output member of the engine, such as a flex plate. The front cover is connected to a back cover, which is integral with and causes rotation of an impeller formed internally in the launch device.

The impeller includes a series of blades or vanes that extend inward in the chamber defined by the front and rear covers. During rotation of the impeller, hydraulic fluid within the chamber is forced radially outward, under centrifugal forces, then forward (toward the engine in a typically configuration) by the blades of the impeller. The forwardly directed fluid impacts blades of a turbine, which are opposed to the blades of the impeller. The force of the hydraulic fluid impacting the turbine blades, in conjunction with the shape of the turbine blades, causes the turbine to rotate and redirects the hydraulic fluid radially inward (toward the rotational axis of the launch downward) and, subsequently, back towards the impeller. The turbine is further mounted to a hub, which is in turn mounted to the input shaft of the automatic transmission. Thus, rotation of the turbine and its hub causes rotation of the input shaft of the automatic transmission.

To enable torque multiplication, located between the lower portions of turbine and impeller blades is a stator mounted on a one-way clutch. The stator redirects fluid from the turbine so that it is received by the impeller without impeding rotation of the impeller, thereby resulting in the torque multiplication. As seen from the above description, the impeller, turbine and stator define a hydrodynamic coupling or circuit in the torque converter.

Forward of the turbine, between the turbine and the front cover, the torque converter also includes a damper and a clutch assembly, the former of which is sometimes referred to as a dynamic absorber. The clutch assembly may arranged on the forward or the engine side of the torque converter and, when engaged, locks rotation of the turbine with rotation of the front cover and, therefore, the output of the engine. While locked-up, as well as during engagement and disengagement of the clutch assembly, oscillations (fluctuations and variations) of the engine's rotational speed can be transferred through the torque converter. This vibration and resulting noise can often be felt and heard by the operator of the automobile. The damper/absorber is provided in the launch device to limit the noise and vibration experienced by the operator.

Axial forces within the torque converter impact the axial position of the hub to which the turbine is attached. In configurations where the torque converter includes a turbine mounted clutch, this axial movement impacts the axial positon of the clutch's piston (the clutch piston), and therefore the distance the clutch piston must move before the clutch plate engages with the front cover. This distance impacts not only the time required for engagement and lockup, but also the ability of the torque converter to build up pressure and cause movement of the clutch piston.

Various systems developed to mitigate the above issue have been complicated and required redesigning of the torque converter itself and the clutch lock up set up. The systems have failed to be readily applied to conventional torque converter clutch lock up set ups.

SUMMARY

In overcoming various drawbacks and other limitations of the known art, the present invention provides a launch device, for coupling a rotary output of a prime mover to a rotary input of a transmission for a vehicle, having a mechanical clutch piston positioner, that axially positions the clutch piston of a lock-out clutch toward the front cover in a coast mode of operation.

In one aspect of the invention, the launch device includes a front cover configured to connect to the rotary output of the prime mover; an output hub defining a central axis and configured to connect to the rotary input of the transmission; an impeller coupled to the front cover and driven in rotation with the front cover; a turbine generally opposing the impeller and being fluidly coupled to the impeller, the turbine being driven in rotation by the fluid coupling with the impeller and being connected to and rotatable with the output hub; a damper including an input member, an output member and a plurality of biasing members coupling the input member to the output member for relative rotation therebetween, the output member being connected to and rotatable with the output hub; a lock-up clutch coupled to the input member of the damper and configured to lock the damper for rotation with the front cover, the lock-up clutch including a clutch piston being axially and rotationally moveable relative to the output hub; and wherein the launch device is characterized by a mechanical clutch piston positioner, the mechanical clutch piston positioner including first interface and a second interface, the first interface being associated with the clutch piston, the second interface being associated with one of the output member of the damper and the output hub, the first interface being coupled to the second interface for axial and rotational relative movement, whereby upon overrunning rotational movement the first interface relative to the second interface the first interface mechanically engages the second interface and axially positions the clutch piston toward the front cover.

In another aspect, the first interface includes first projections extending toward the second interface and the second interface includes second projections extending toward the first interface.

In a further aspect, the first interface is connected to the clutch piston.

In an additional aspect, the first interface is directly connected to the clutch piston.

In yet another aspect, the first projections extend from a first ring.

In still a further aspect, the first ring is continuous about a central axis of the launch device.

In an additional aspect, the second interface is connected to the one of the output member and the output hub.

In still another aspect the second interface is directly connected to the one of the output member and the output hub.

In yet a further aspect, the second projections extend from a second ring.

In an additional aspect, the second ring is continuous about a central axis of the launch device.

In another aspect, the first projections are tabs.

In a further aspect, the tabs are resilient tabs.

In an additional aspect, the tabs extend in an oblique direction toward the second interface.

In still another aspect, each of the tabs terminates in a reversely bent end forming a bight.

In yet a further aspect, the second projections are raised lands.

In an additional aspect, the raised lands are rigid.

In yet another aspect, the raised lands include a planar top surface.

In still a further aspect, the top surface is perpendicular to a central axis of the launch device.

In an additional aspect, the first interface is a unitary device.

In another aspect, the second interface is a unitary device.

In a further aspect, the turbine is connected to the input member of the damper and rotationally drives the input member.

Further objects, features and advantages of this invention will become readily apparent to persons skilled in the art after review of the following description with reference to the drawings and the claims that are appended to and form a part of this specification.

DETAILED DESCRIPTION

Figure 1:
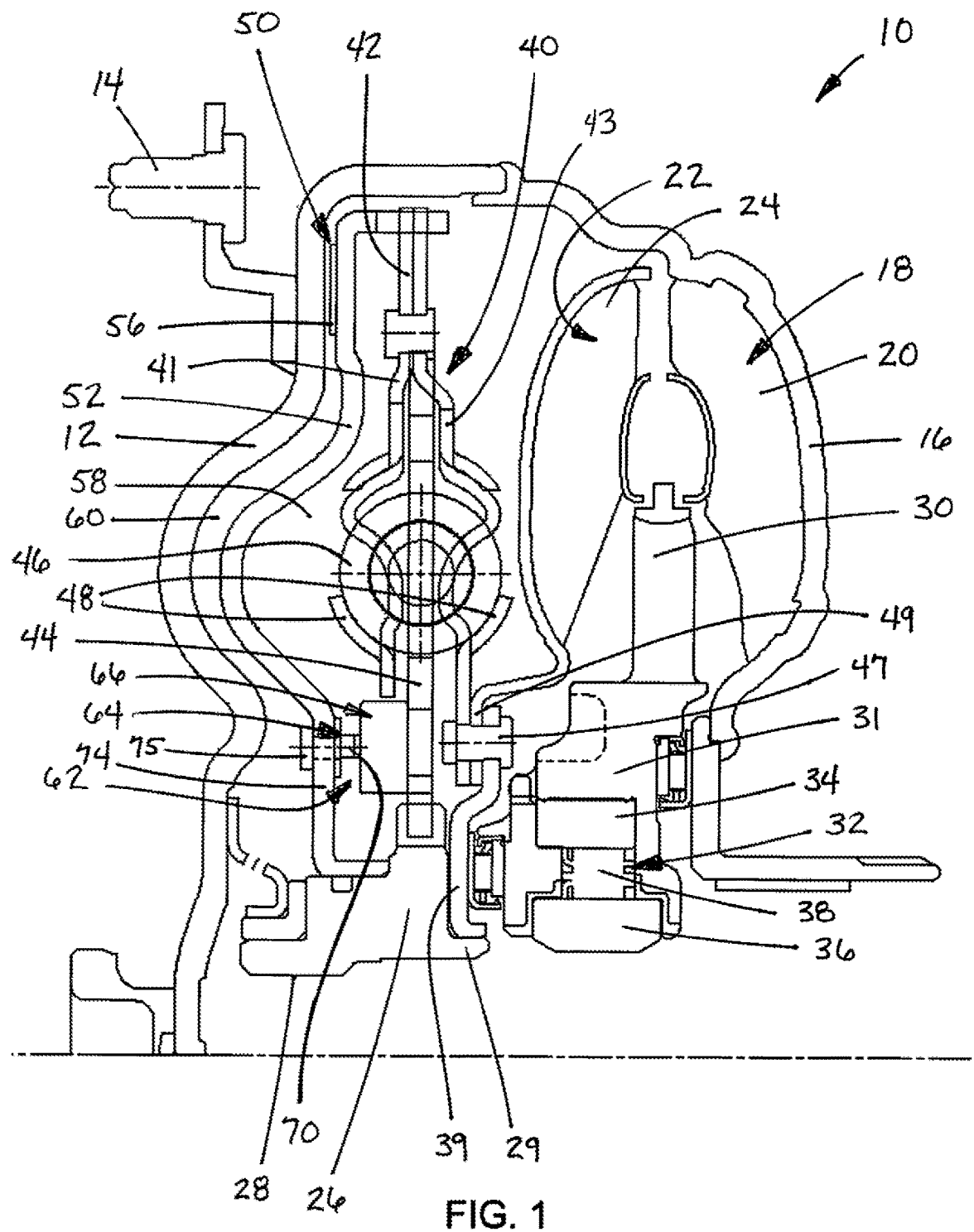
FIG. 1 is a cross-section of a torque converter embodying the principles of the present invention in a drive mode of operation and with the lock-up clutch in an open condition.

Referring now to the drawings, a launch device embodying the principles of the present invention is generally illustrated therein and will be described with reference thereto. The description that follows may use directional terms such as "upper" and "lower." These terms are intended to be read in the context of the orientation of the elements as presented in the drawings. Accordingly, "upper" indicates a direction toward the top of the drawing and "lower" indicates a direction toward the bottom of the drawing. The terms "left" and "right" are similarly interpreted. The terms "inward" or "inner" and "outward" or "outer" indicate a direction that is generally toward or away from a central axis of the referred to part, whether or not such an axis is designated in the drawing. An axial surface is a surface one that faces in the noted axial direction. In other words, an axial surface faces in a direction along the referred to axis. A radial surface therefore faces radially, generally away from or toward the referenced axis. It will be understood, however, that these relative terms are for convenience of description that are not intended to require a particular orientation. In actual implementation, the directional references used herein may not necessarily correspond with the installation and orientation of the corresponding components of the device.

Terms concerning attachments, couplings and the like, such as "connected," "joined," "mounted" or "interconnected" refer to a relationship where the structures are secured or attached to one another either directly or indirectly through an intervening structure. These attachments and relationships may be movable or rigid, unless expressly described otherwise. "Integral" means that elements are connected together so as to form one unit. "Unitary" means a single, one piece element where all parts of the element are formed together. Thus, the term "unitary" is to be distinguished from the term "integral."

Referring now to FIG. 1, a launch device embodying the principles of the present invention is generally illustrated therein and designated at 10. The launch device 10 includes a front cover 12 having mounting features 14, such as threaded studs, provided at spaced apart locations about its periphery and configured to connect the launch device 10 to the output member, such as a flex plate, of a prime mover. The prime mover is a motive power source, such as a motor and including, without limitation, internal combustion engines, electric motors, and other motive power source or combinations thereof. At its radial periphery, the front cover 12 is secured to a rear cover 16 by a weld, or other suitable means, to form a fluid tight chamber.

As outlined above, the front cover 12 defines the engine side of the launch device 10, while the rear cover 16 defines the transmission side of the launch device 10. As the flex plate is rotated by the crankshaft (not shown) of the prime mover, the front and rear covers 12, 16 are rotated therewith.

Figure 3:
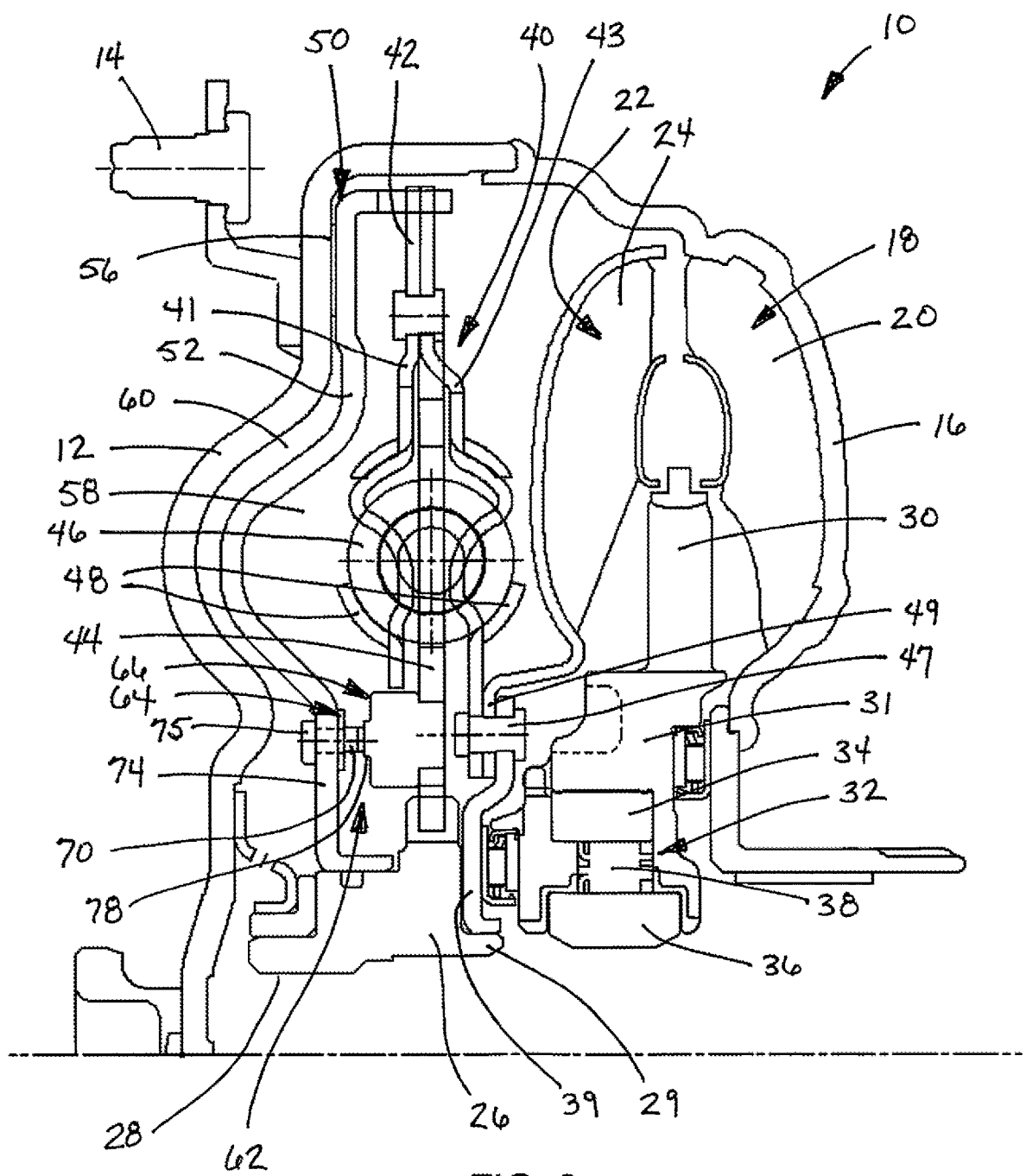
FIG. 3 is a cross-section of a torque converter embodying the principles of the present invention in a coast mode of operation and with the lock-up clutch in a closed and ready-to-be engaged condition.

Internally, the rear cover 16 is provided with a series of blades or vanes 20 so as to form an impeller 18. During rotation of the rear cover 16, hydraulic fluid is supplied from the automatic transmission and is forced radially outwardly under the centrifugal force generated by the rotating impeller blades 20. The impeller blades 20 also directs the hydraulic fluid forward, in a direction away from the rear cover 16. In FIGS. 1 and 3, outward motion of the hydraulic fluid is toward the top of the figure and forward motion of fluid is toward the left of the figures.

Immediately forward of the impeller 18, the launch device 10 includes a turbine 22. The turbine 22 is also formed with a series of blades 24. The turbine blades 24 are oriented to receive the hydraulic fluid from the impeller blades 20. The force of the fluid received from the impeller 18, as well as the shape of the turbine blades 24 themselves, rotationally drives the turbine 22 in the same direction as the rotational direction of the impeller 18. The hydraulic fluid received by the turbine 22 is in turn re-directed inward and rearward, back to the impeller 18.

Positioned between the radially inner portions of the impeller blades 22 and turbine blades 24 is a stator 30. The stator 30 receives the hydraulic fluid being returned from the turbine 22 to the impeller 18. The stator 30 intercepts the fluid from the turbine 20 and redirects the fluid so that its rotational direction is aligned with rotational direction of the impeller 18. This redirection is conducted in such a manner that the returned hydraulic fluid is efficiently received by the impeller 18 in a manner that does not impede rotation of the impeller 18, but that instead augments rotation allowing for a multiplication of the torque passing through the launch device 10. With the inclusion of the above fluid coupling, rotation from the engine is transferred as rotation to the transmission of the vehicle.

Integrated with the stator 30 is a one-way clutch assembly 32 that limits rotation of the stator 30 to a single direction. The one-way clutch assembly 32 includes an outer race 34, upon which a hub 31 of the stator 30 is mounted. The one-way clutch assembly 32 also includes an inner race 36 and roller elements 38, the latter of which are located between the outer and inner races 34, 36. The inner race 36 of the one-way clutch assembly 32 is mounted upon a fixed, nonrotating support shaft (not shown) associated with the input of the transmission. In the interest of brevity, and since one-way clutch assemblies are well known in the field of the present invention, those skilled in the art will really appreciate the construction and operation of the one-way clutch assembly 32. As such, the one-way clutch assembly 32 is not and need not be explained in greater detail.

The turbine 22 is supported by an output hub 26, which is connected to an input shaft (not shown) of the vehicle's transmission (not shown) by way of a spline connection 28. This support is facilitated by a hub flange 39 that is radially supported on an inner flange 29 of the output hub 26 so as to permit relative rotation therebetween. The turbine 22 is fixedly mounted to the periphery of the hub flange 39 at the turbine's central hub 49 by way of a plurality of rivets 47 extending through the central hub 49 and the hub flange 39.

Forward of the turbine 22, generally in a position between the turbine 22 and the front cover 12, the launch device 10 includes a damper 40, which operates to absorb variations in the rotation speed of the output from the prime mover, transmitted via the shell formed by the front and rear covers 12, 18, to decrease vibration being felt by the occupants of the vehicle and to provide for smoother operation of the vehicle's automatic transmission.

The damper 40 includes an input member 42, an output member 44 and a plurality of springs 46, which are arranged circumferentially between the input member 42 and the output member 44. The input member 42 further includes a front side plate 41 and a rear side plate 43, the latter of which is fixed at its inner periphery to the central hub 49 of the turbine 20 by the previously mentioned rivets 47. The output member 44 of the damper 40 is fixedly coupled to the output hub 26 to drive the output hub 26 and, therefore, the input member of the transmission.

The springs 46 of the damper 40 are supported by opposing wings 48 defined in each of the front and rear side plates 41, 43. Torsional movement that is inputted by the input member 42 is thus transmitted to the springs 46, which dampens and circumferentially transmits the torsional movement to the output member 44 and output hub 26, which in turn transmit the torsional movement, i.e. rotation, to the input shaft of the transmission. As a result of the connection by the springs 46, limited relative rotation exists between the input member 42 and the output member 44.

As with the one-way clutch assembly 32 discussed above, dampers of this general type are well known in the field of the present invention and those skilled in the art will really appreciate the construction and operation of the damper 40. Accordingly, the damper 40 is not be explained in further detail herein.

Between the damper 40 and the front cover 12, a lock-up clutch assembly 50 is provided. When engaged, the lock-up clutch assembly 50 locks rotation of the front cover 12 with the output hub 26 and the input shaft of the transmission, generally bypassing the fluid coupling between the impeller 18 and the turbine 20.

The lock-up clutch assembly 50 includes a clutch piston 52 radially supported by the output hub 26. Friction material 56 may be provided on a surface of the clutch piston 52 that engages with the inner surface of the front cover 12 in the lock-up condition. Optionally, friction material may also be provided on the inner surface of the front cover 12, opposite of the friction material 56 of the clutch piston 52.

The clutch piston 52 is also rotationally linked to the damper 40. In the exemplary embodiment seen in FIG. 1, the clutch piston 52 is joined to the input member 42 of the damper 40 at the outer perimeter of the damper 40 so that the clutch piston 54 rotates with the input member 42, and therefore the turbine 20 to which the input member 42 is rotationally coupled. While rotationally fixed to the input member 42 of the damper 40, the joined portion between the clutch piston 52 and input member 42 are axially moveable relative to one another.

Engagement of the lock-up clutch assembly 50 is controlled by axial movement of the clutch piston 52. In this regard, the clutch piston 52 is radially supported on the output hub 26 so as to be axially and rotationally moveable relative to the output hub 26. An engagement or "ON" pressure chamber 58 is generally defined between the clutch piston 52 and the rear cover 16. A disengagement or "OFF" pressure chamber 60 is defined between the clutch piston 54 and the front cover 12. When engaging pressure is provided, via hydraulic fluid supplied and directed to the ON pressure chamber 58, the clutch piston 52 is moved toward the front cover 12 and the clutch piston 52 engages the inner surface of the front cover 12 via the friction material 56 provided therebetween. When disengaging pressure is provided, via hydraulic fluid supplied and directed to the OFF pressure chamber 60, the clutch piston 52 is moved away and disengaged from the front cover 12. While not shown, fluid seals are provided to maintain the fluidic integrity of the ON and OFF pressure chambers 58, 60 while permitting the clutch piston 52 to axially move relative to the reaction plate.

As seen in FIG. 1, when the vehicle is being operated in a drive mode, meaning the accelerator pedal is being depressed and there is a positive output of torque from the prime mover and flex plate, the lock-up clutch assembly 50 may be disengaged and, therefore, the clutch piston 52 may be disengaged from the front cover 12 via hydraulic fluid provided to the OFF pressure chamber 60. When the torque demand of the drive mode is sufficient enough, the lock-up assembly 50 is engaged and the clutch piston 52 engages the front cover 12 as a result of hydraulic fluid pressure being provided to the ON pressure chamber 58.

When the vehicle is in coast mode, no demand is being made to deliver torque from the prime mover to the transmission and the clutch piston 52 is not engaged with the front cover 12 so as to lock-up the lock-up clutch assembly 50. In this situation, because of internal hydraulic forces in the launch device 10, the clutch piston 52 tends to be axially drawn in a direction moving the clutch piston 52 away from the front cover 12. If the clutch piston 52 is moved too far from the front cover 12 during a coast mode event, during the next transition into a drive mode event requiring the lock-up clutch assemble 50 to engage, the engagement of lock-up clutch assembly 50 may be abrupt, inducing excessive vibration and noise into the powertrain system and providing an undesirable sensation to the occupants of the vehicle.

Accordingly to the principles of the present invention, a mechanical clutch piston positioning system (MCPPS) 62 is provided to mechanically position the clutch piston 52 and relative to the front cover 12 during coast mode operation of the launch device 10 so that excessive vibration and noise is not induced into the powertrain system during the next transition to a drive mode operating condition requiring engagement of the lock-up clutch assembly 50.

Figure 2A:
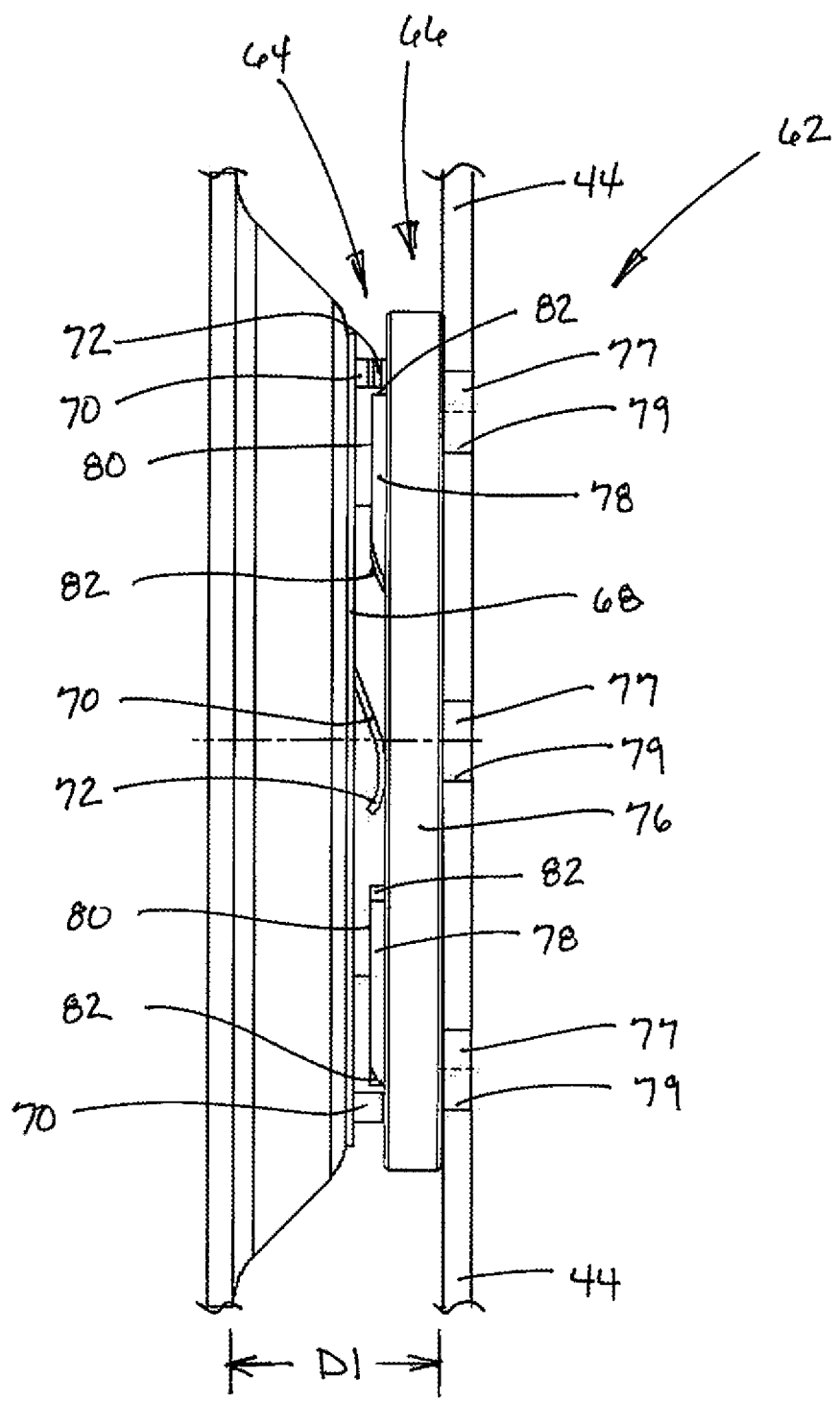
FIG. 2A illustrates a portion of the torque converter seen in FIG. 1, and as generally encircled by line 2-2, in a drive mode of operation where the lock-up clutch of the torque converter is in an open condition.
Figure 2B:
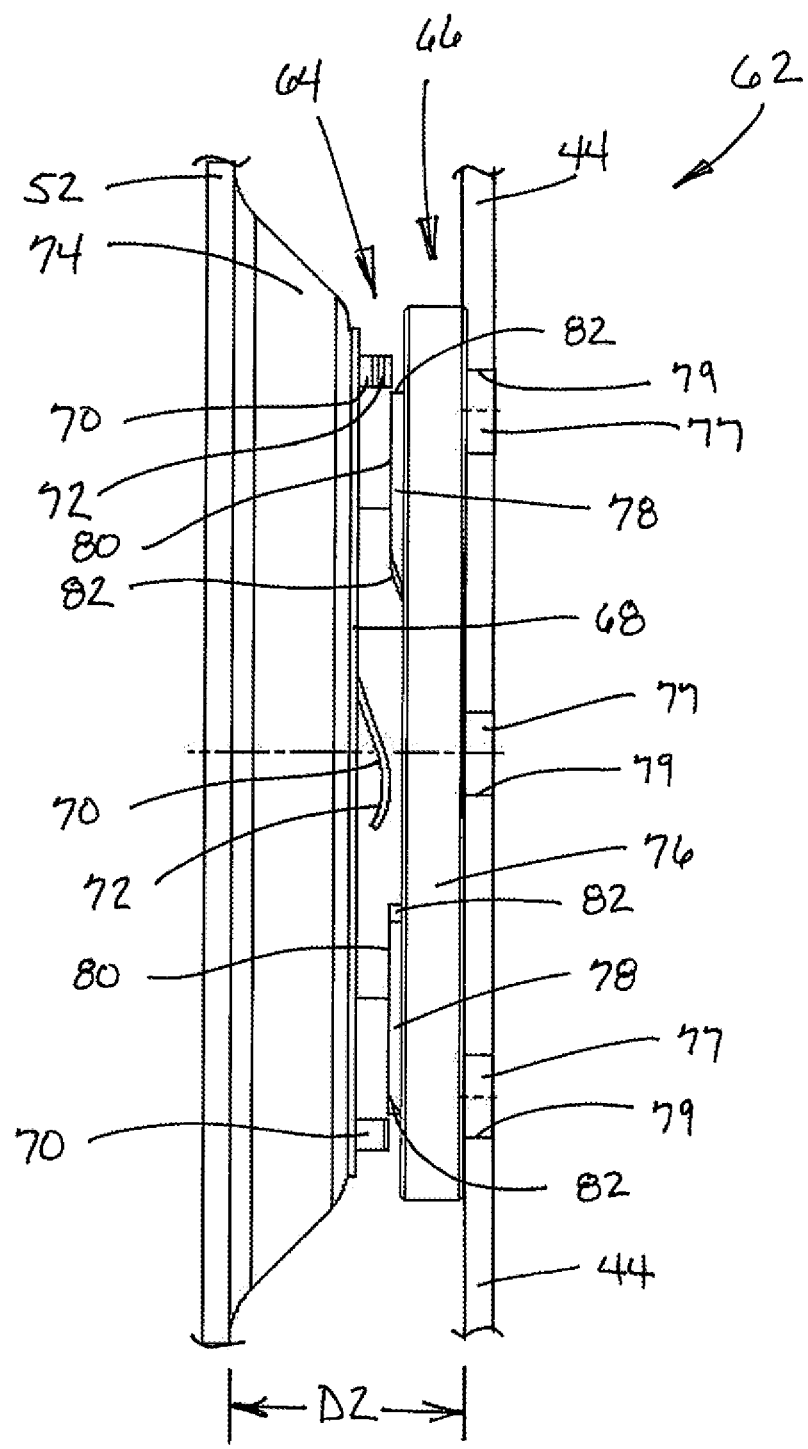
FIG. 2B illustrates a portion of the torque converter seen in FIG. 1, and as generally encircled by line 2-2, in a drive mode of operation where the lock-up clutch of the torque converter is in an engaged condition.
Figure 4:
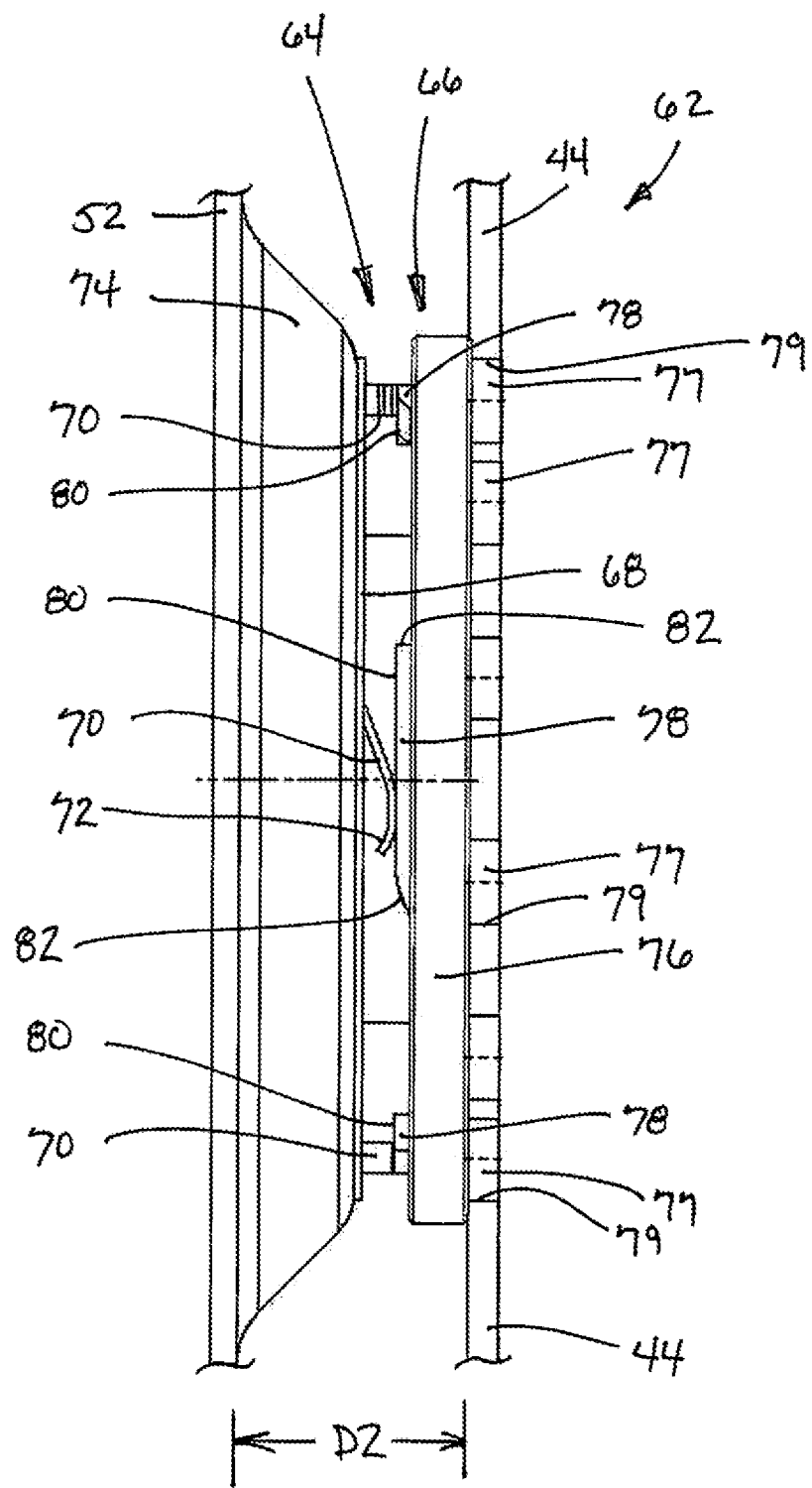
FIG. 4 illustrates a portion of the torque converter shown in FIG. 3, as generally encircled by line 4-4, in a coast mode of operation with the clutch piston mechanically positioned in the closed and ready-to-be engaged condition.

As representatively shown in FIG. 2A, FIG. 2B and FIG. 4, the MCPPS 62 includes a first interface 64 associated with the clutch piston 52 and a second interface 66 associated with the output member 44 of the damper 40 or, alternatively, the output hub 26 or a spacer accompanying one of the output member 44 and the output hub 26.

In the illustrated embodiment, the first interface 64 includes a first ring 68 from which extend, at preferably equidistant spaced apart locations, spring tabs 70 in a direction toward the rear cover 16. The tabs 70 are also preferably unitarily formed with the first ring 68 and extend at an angle, obliquely, until terminating in generally hook-shaped ends 72 that are directed back toward the ring 68. The first ring 68 is fixedly secured, by rivets 75 or other means such as welds, to a central hub 74 of the clutch piston 52 and extends circumferentially about the output hub 26.

The second interface 66 is illustrated as being associated with the output member 44. As noted above, the second interface 66 could be associated with the output hub 26 or a spacer associated with one of the output hub 26 or output member 44. The second interface 66 includes a second ring 76 engaged with the output member 44 for rotation with the output member 44. In the illustrated embodiment, the second ring 76 includes protruding bosses 77 that extend into corresponding apertures 79 formed in the output member 44. The engagement of the bosses 77 in with the apertures 79 may be a floating engagement allowing the second ring to axially move relative to the output member 44. Alternatively, the engagement of the bosses 77 in with the apertures 79 may fixed the second interface 66 to the output member 44.

Provided on the second ring 76 are a series of unitarily formed, raised lands 78 that protrude in a direction toward the clutch piston 52. The lands 78 are preferably spaced about the circumference of the second ring 76 at regular intervals, but in any event are provided so as to generally oppose each of the tabs 72 of the first interface 64. The shape of the lands 78 includes a length extending circumferentially with a flat top surface 80 between end faces 82. This provides the lands 78 with a block shape when viewed laterally. The shape of the lands 78, however, is not restricted to the illustrated shape. Rather any shape forming a raised land may be employed so long as the functional consideration of the lands 78 described herein can be achieved by the shape.

While the first and second interfaces 64, 66 are respectfully described as including a first ring 68 with spring tabs 70 and second ring 76 with raised lands 78, it will be appreciated that constructions of the first and second interfaces 64, 66 may be reversed, with the first interface 64 including the ring 76 with lands 78 and the second interface 66 including the ring 68 with spring tabs 70. As a further alternative, both interfaces 64, 66 may include spring tabs 70 or both interfaces 64, 66 may include raised lands 76. In further alternatives, the raised lands 76 may be provided directly on the output member 44 or the output hub 26. Also, any of the above mentioned rings 68, 76 may be circumferentially discontinuous and not extend continuously about either the clutch piston, output hub or other associated structure.

Referring now to FIG. 2A, as illustrated therein, the clutch piston 52 is in a drive mode where the lock-up clutch assembly 50 is disengaged, hydraulic fluid pressure is being provided to the OFF pressure chamber 60, and the clutch piston 52 and output member 44 are spaced by a distance D1. In this condition, the clutch piston 52 is moved toward the output member 44 and the ends 72 of the tabs 70 are displaced axially beyond the top surface 80 of the lands 78, generally near or against the axial face of the second ring 76. Resultantly, the friction material 56 of the clutch piston 52 is spaced apart from the inner surface of the front cover 12. The distance that the spring tabs 70 extend from the first ring 68 may be dimensioned so that the spring tabs 70 are capable of engaging and biasing the second ring 76 toward the output member 44, keeping the second interface 66 engaged with the output member, particularly when the engagement is not a fixed engagement.

In the drive mode where the lock-up clutch assembly 50 is engaged, as represented by FIG. 2B, hydraulic fluid pressure is being provided to the ON pressure chamber 58, and the clutch piston 52 and output member 44 are spaced by a distance D2, which is greater than D1. In this condition, the clutch piston 52 is moved away from the output member 44 and the ends 72 of the tabs 70 are displaced away from the second ring 76, as a result of the fluid pressure, and are generally axially aligned with the top surface 80 of the lands 78. The friction material 56 of the clutch piston 52 is engaged with the inner surface of the front cover 12 and sufficient pressure is being applied so that the lock-up clutch assembly 50 is in a locked-up condition.

In a coast mode, which seen in FIGS. 3 and 4, no torque is being outputted from the prime mover to drive the launch device 10. As a result, the clutch piston 52, front and rear side plates 41, 42 and turbine 22 exhibit a greater rotational rate than the output member 44 and output hub 26, and the clutch piston 52 overruns, to a degree, the output member 44 and output hub. This is defined by the angular travel of the output member 44 of the damper relative to the clutch piston 52 or turbine 20.

The relative rotation of the output member 44 and the clutch piston 52 results relative rotation between the first interface 64 and the second interface 66, and therefore the tabs 70 and the lands 78. This limited degree of relative rotation results in the ends 72 of the tabs 70 moving up, over and onto the top surfaces 80 of the lands 78. In this position, the first and second interfaces 64, 66 mechanically displace the clutch piston 52, even without hydraulic fluid pressure in the ON pressure chamber 58 sufficient to perform such displacement. This displacement is also against hydraulic forces tending to move the clutch piston 52 away from the front cover 12. Thus, the clutch piston 52 and output member 44 are spaced by a distance D2, and the friction material 56 of the clutch piston 52 is brought into engagement with the inner surface of the front cover 12 or any friction material, if provided. It is noted, however, that the force applied between the respective surfaces is insufficient to put the lock-up clutch assembly 50 into a locked-up state.

With the clutch piston 52 positioned as noted above, upon the next transition to a drive mode of operation, the clutch piston 52 is in position to immediately place the lock-up clutch assembly 50 in the lock-up condition without inducing unnecessary vibration and noise into the system.

As a person skilled in the art will readily appreciate, the above description is meant as an illustration of at least one implementation of a launch device incorporating the principles of the present invention. This description is not intended to limit the scope or application of this invention since the invention is susceptible to modification, variation and change without departing from the spirit of this invention, as defined in the following claims.

We claim:

1. A launch device for coupling a rotary output of a prime mover to a rotary input of a transmission for a vehicle, the launch device comprising:
    a front cover configured to connect to the rotary output of the prime mover;
    an output hub defining a central axis and configured to connect to the rotary input of the transmission;
    an impeller coupled to the front cover and driven in rotation with the front cover;
    a turbine generally opposing the impeller and being fluidly coupled to the impeller, the turbine being driven in rotation by the fluid coupling with the impeller and being connected to and rotatable with the output hub;
    a damper including an input member, an output member and a plurality of biasing members coupling the input member to the output member for relative rotation therebetween, the output member being connected to and rotatable with the output hub;
    a lock-up clutch coupled to the input member of the damper and configured to lock the damper for rotation with the front cover, the lock-up clutch being positioned between the damper and the front cover and including a clutch piston being axially and rotationally moveable relative to the output hub; and
    a mechanical clutch piston positioner, the mechanical clutch piston positioner including first interface and a second interface, the first interface being associated with and directly connected to the clutch piston, the second interface being associated with and directly connected to one of the output member of the damper and the output hub, the first interface being coupled to the second interface for axial and rotational relative movement, whereby upon overrunning rotational movement the first interface relative to the second interface the first interface mechanically engages the second interface and axially positons the clutch piston toward the front cover, the first interface including first projections and the second interface including second projections, one of the first and second projections being resilient tabs and the other of the first and second projections being rigid raised lands, the tabs extending in an oblique direction toward the raised lands and terminating in a reversely bent end.

2. The launch device according to claim 1, wherein the first projections extend toward the second interface and the second projections extend toward the first interface.

3. The launch device according to claim 1, wherein the first projections extend from a first ring.

4. The launch device according to claim 3, wherein the first ring is continuous about a central axis of the launch device.

5. The launch device according to claim 1, wherein the second projections extend from a second ring.

6. The launch device according to claim 5, wherein the second ring is continuous about a central axis of the launch device.

7. The launch device according to claim 1, wherein the raised lands include a planar top surface.

8. The launch device according to claim 7, wherein the top surface is perpendicular to a central axis of the launch device.

9. The launch device according to claim 1, wherein the first interface is a unitary device.

10. The launch device according to claim 1, wherein the second interface is a unitary device.

11. The launch device according to claim 1, wherein the turbine is connected to the input member of the damper and rotationally drives the input member.

* * * * *